(12) United States Patent
Lopez

(10) Patent No.: US 6,285,545 B1
(45) Date of Patent: *Sep. 4, 2001

(54) SHOCK MOUNTING SYSTEM FOR DATA STORAGE MODULES

(75) Inventor: Robert Lopez, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/644,158

(22) Filed: Aug. 22, 2000

Related U.S. Application Data

(63) Continuation of application No. 09/103,667, filed on Jun. 23, 1998.

(51) Int. Cl.[7] .................................................. H05K 5/00
(52) U.S. Cl. ...................... 361/683; 361/724; 312/223.1; 360/98.01
(58) Field of Search .................................... 361/683, 685, 361/725–727; 360/137, 97.01, 98.01; 364/78.1; 312/223.2, 223.1; 174/52.1

(56) References Cited

U.S. PATENT DOCUMENTS

| 5,262,923 | * | 11/1993 | Batta et al. ........................... 361/685 |
| 5,668,696 | * | 9/1997 | Schmitt ................................. 361/685 |
| 5,828,547 | * | 10/1998 | Francovich et al. .................. 361/685 |
| 6,134,113 | * | 10/2000 | Mills et al. ........................... 361/725 |
| 6,141,222 | * | 10/2000 | Toor et al. ............................ 361/726 |
| 6,160,703 | * | 12/2000 | Lopez .................................... 361/685 |

* cited by examiner

Primary Examiner—Leo P. Picard
Assistant Examiner—Hung Van Duong

(57) ABSTRACT

A shock mounting system for data storage modules that house disk drives such as those used in RAID systems. In one embodiment of the invention, a flexible spacer formed on or fastened to the module housing provides the desired tight but cushioned fit between the module and the enclosure. In a second embodiment, a flexible guide formed on or fastened to the enclosure that houses the modules provides the desired fit.

8 Claims, 9 Drawing Sheets

SHOCK MOUNTING SYSTEM FOR DATA STORAGE MODULES

This application is a continuation of Ser. No. 09/103,667 filed Jun. 23, 1998.

FIELD OF THE INVENTION

The invention relates to a shock mounting system for data storage modules.

BACKGROUND OF THE INVENTION

Redundant arrays of inexpensive or independent storage devices (RAID) are being employed by the mass storage industry to provide variable capacity storage. RAID systems use interconnected disk drives to achieve the desired capacity of mass storage. With this approach, a disk drive of one capacity may be manufactured and packaged with the same or different capacity drives to provide the required storage capacity. RAID systems eliminate the need to manufacture disk drives individually designed to meet specific storage requirements. Each disk drive in a RAID system is usually housed in an individual module for handling and installation. The modules slide into and out of an enclosure that houses the array of disk drives and provides the sockets, plug-ins and other connections for the electrical interconnection of the drives. Controllers orchestrate the interconnection and control access to selected disk drives for data reading and writing operations.

Disk drives are high precision electro-mechanical devices in which the read/write heads fly on an air bearing at the surface of the disks. The flight height of the head is only a few microns from the disk surface. This and other sensitive aspects of the disk drives make them vulnerable to data storage defects, operational disturbances and physical damage in all but the most gentle environments. It has been observed that even the slight clearances between modules and the enclosure housing into which they slide can be the source of operational disturbances and, perhaps, damage. These clearances allow the modules to "crash" into the enclosure's rigid support structures when the enclosure is exposed to non-operational shock and vibration. The shock mounting systems typically used for mounting the disk drives in the modules are not always effective to protect the disk drives from the high frequency inputs associated with the module crashing against the enclosure.

SUMMARY OF THE INVENTION

The present invention is directed to a shock mounting system for data storage modules that house disk drives and other data storage devices such as those used in RAID systems. In one embodiment of the invention, a flexible spacer formed on or fastened to the module housing provides the desired tight but cushioned fit between the module and the enclosure. In a second embodiment, a flexible guide formed on or fastened to the enclosure that houses the modules provides the desired fit. It is expected that the invention will reduce or eliminate operating disturbances and damage that may be associated with collisions between the storage modules and the rigid enclosure structures, resulting in improved performance and reliability of disk drives and other data storage devices.

A data storage module constructed according to the first embodiment of the invention includes a housing that has bearing surfaces configured to bear against guide surfaces in the module enclosure. A flexible spacer protrudes from at least one of the bearing surfaces. The flexible spacer may be, for example, an elastomeric member or a spring.

An enclosure for data storage modules constructed according to the second embodiment includes opposing side walls, an open end and a series of slots formed along each sidewall. The slots are configured to receive data storage modules through the open end of the enclosure. Each slot is defined by one or more pairs of first guides and opposing second guides. The guides protrude from each sidewall to bear on the storage modules. The guides are spaced apart a distance slightly less than the thickness of the storage module to create an interference fit between the module and the enclosure. At least one of the guides in each pair includes a flexible member. The flexible member may be, for example, an elastomeric member or a spring.

DESCRIPTION OF THE DRAWINGS

Like parts are referred to by like reference numbers in all Figures.

DETAILED DESCRIPTION OF THE INVENTION

Two embodiments of the invention, as summarized above, will be described with reference to FIGS. 1–6 (for the first embodiment) and to FIGS. 7–10 (for the second embodiment). In the first embodiment, a flexible spacer formed on or fastened to the disk drive module housing provides the desired tight but cushioned fit between the module and the enclosure. In the second embodiment, a flexible guide formed on or fastened to the enclosure provides the desired fit.

Figure 1:
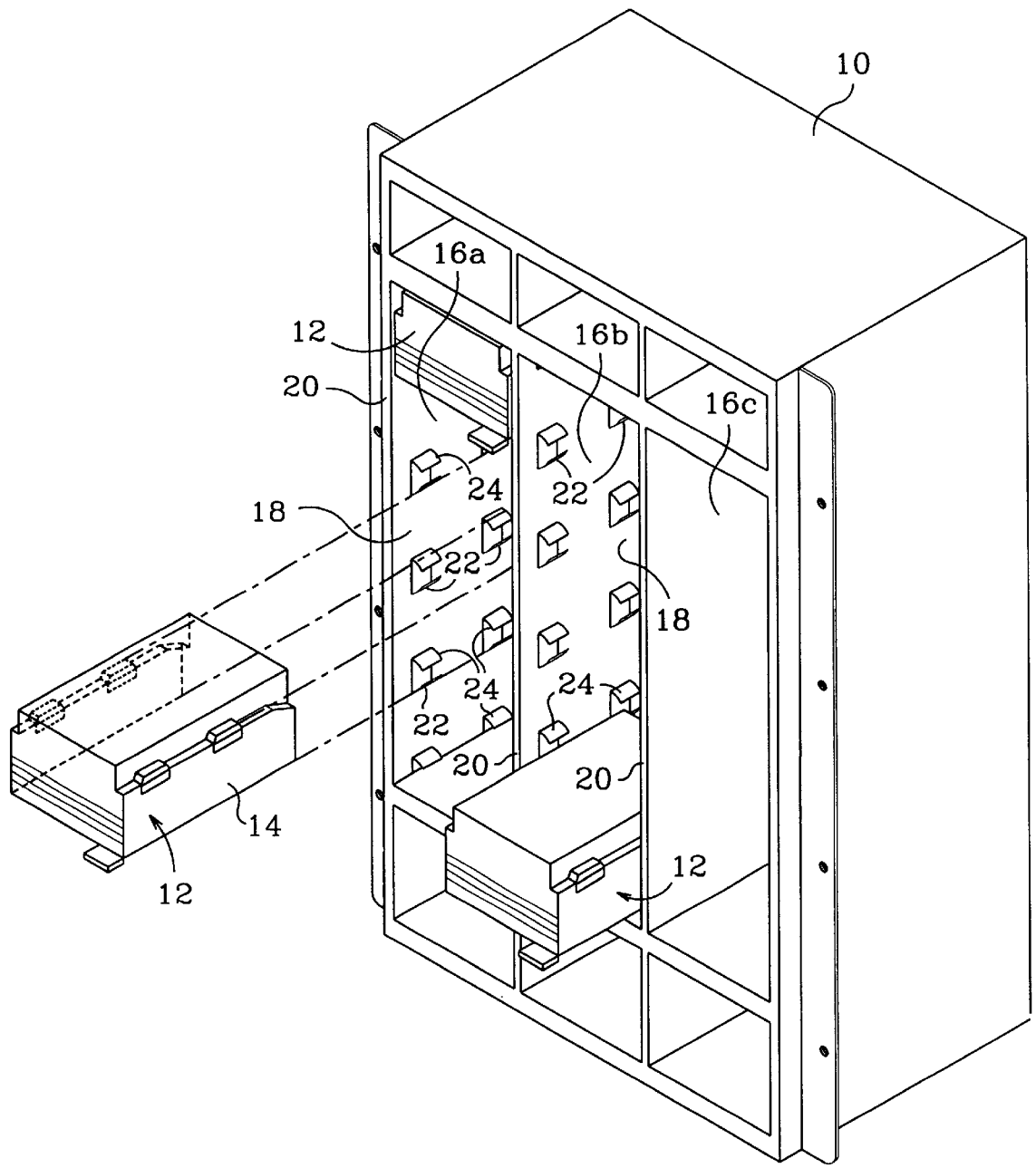
FIG. 1 is an isometric view of a conventional enclosure that houses an array of disk drive modules constructed according to one embodiment of the invention.

FIG. 1 is an isometric view of a conventional enclosure 10 for a redundant array of independent devices (RAID). Enclosure 10 houses an array of storage modules 12 constructed according to one embodiment of the invention. Each module 12 includes a disk drive or other data storage device (not shown) mounted in a generally rectangular shaped housing 14. The disk drives are connected into the electrical network of the RAID system by, for example, multiple pin connectors (not shown) at the rear of each module 12. Enclosure 10 is partitioned into three bays 16a, 16b and 16c. Bays 16a and 16b house the storage modules 12. The third bay 16c typically houses a controller (not shown) and other operational equipment. Modules 12 slide into a series of slots 18 constructed along the interior walls 20 of enclosure 10. Slots 18 are defined by a series of top guides 22 and bottom guides that protrude from interior sidewalls 20 of enclosure 10.

As a module 12 is inserted into a slot 18, a horizontal ledge 26 formed along the side of module 12 bears on top guides 22 and the bottom edge 28 of module 12 bears on bottom guides 24. In a conventional module/enclosure system, sufficient clearance is provided between top and bottom guides 22 and 24 and modules 12 to allow the modules 12 to slide easily into slots 18. This clearance, however, can be the source of operational disturbances and, perhaps, damage to the disk drives as the modules 12 crash into rigid guides 22 and 24 when the enclosure is exposed to shock and vibration. To minimize or reduce this problem, flexible spacers 30 are added to module housing 14. In the embodiment of the invention shown in FIGS. 1–4, spacers 30 are placed along ledges 26 at locations corresponding to the position of top guides 24 on enclosure 10.

Figure 2:
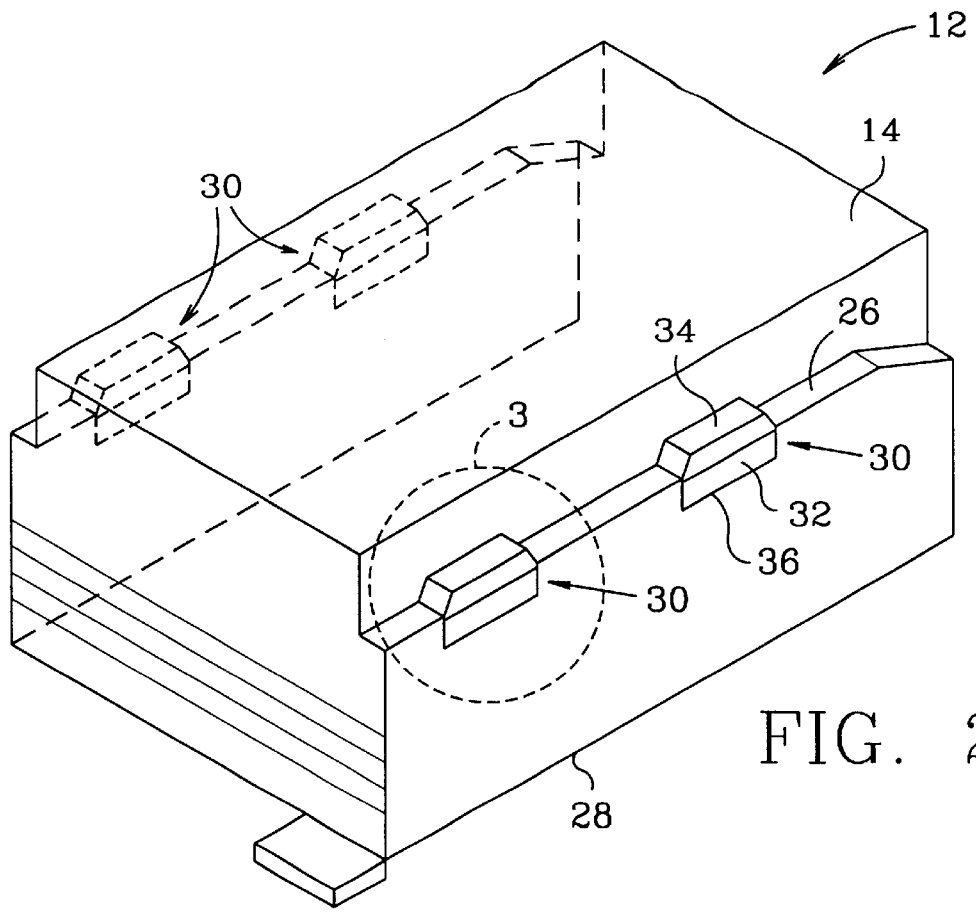
FIG. 2 is an isometric view of one of the modules of FIG. 1 showing one version of the flexible spacer of the present invention in which the spacer includes a rigid portion and a flexible portion.
Figure 3:
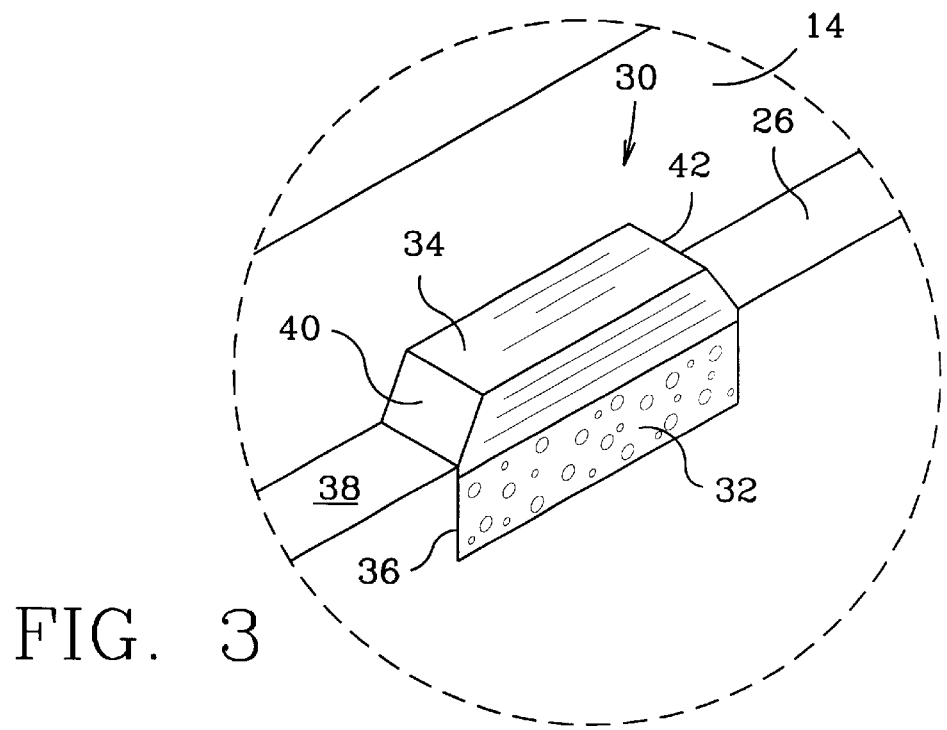
FIG. 3 is a detail isometric view of the spacer of FIG. 2.
Figure 4:
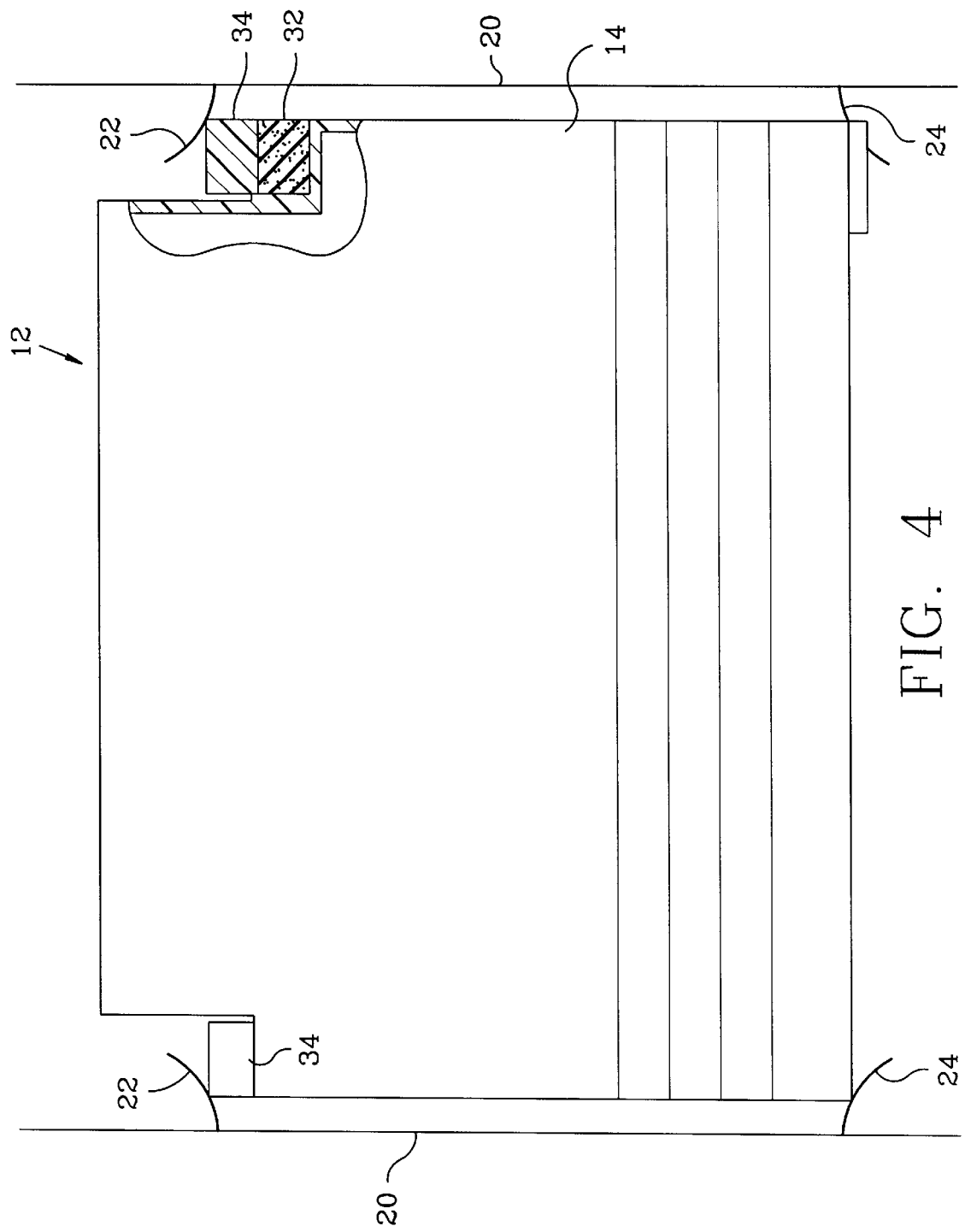
FIG. 4 is a front elevation and partial section view of one of the modules of FIG. 1 inserted in the enclosure.

The details of spacers 30 will now be described with reference to the more detailed views of FIGS. 2–4. Referring to FIGS. 2–4, spacers 30 include a flexible bottom portion 32 and a rigid top portion 34. Flexible bottom portion 32 is located in a recess 36 in ledge 26. Rigid top portion 34 extends above the horizontal surface 38 of ledge 26 to create a slight interference fit between module housing 14 and guides 22 and 24. Bottom portion 32 is made of an elastomeric or other suitably flexible material. Top portion 34 is made of hard plastic or other suitably rigid, preferably smooth material. When a module 12 is inserted into a slot 18, spacers 30 take up any clearance between ledge 26/bottom edge 28 of module housing 14 and guides 22, 24. As the rigid top portion 34 of spacer 30 engages a top guide 22 to take up the clearance, flexible bottom portion 32 compresses to allow the module to continue to slide into slots 18 while maintaining a tight but flexible fit between module housing 14 and enclosure 10. It may be desirable, as shown in FIGS. 2 and 3, to bevel the front and back faces 40 and 42 of spacer 30 to help module housing 14 slide easily into and out of enclosure 10. The distance D that spacer 30 extends above surface 38 of ledge 26 will depend on the clearance between ledge 26/bottom edge 28 and guides 22, 24, the depth of recesses 36, the compression characteristics of flexible bottom portion 32 and the desired "tightness" of the installed "fit" between module housing 14 and enclosure 10. For a typical RAID enclosure, D will be about 1 millimeter. Although it is expected that top and bottom portions 32 and 34 will be glued or bonded together and spacer 30 glued or bonded into module housing 14, any suitable attachment method or device may be used. As best seen in FIGS. 3 and 4, top portion 34 of spacer 30 will extend down into recess 36 as may be necessary or desirable to adequately secure spacer 30 to module housing 14.

Figure 5:
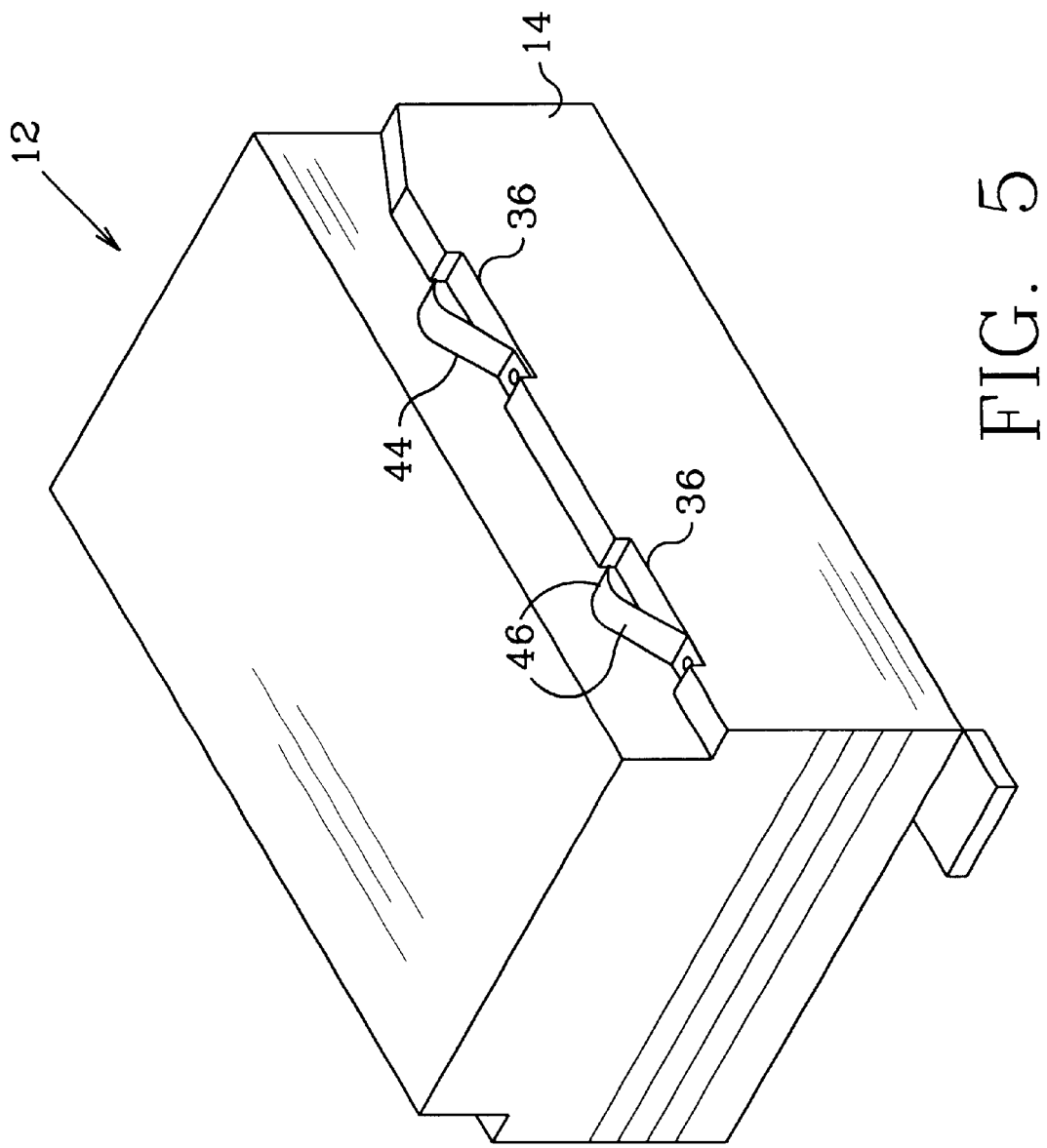
FIG. 5 is an isometric view of a disk drive module showing a second version of the flexible spacer of the present invention in which the spacer is a spring.
Figure 6:
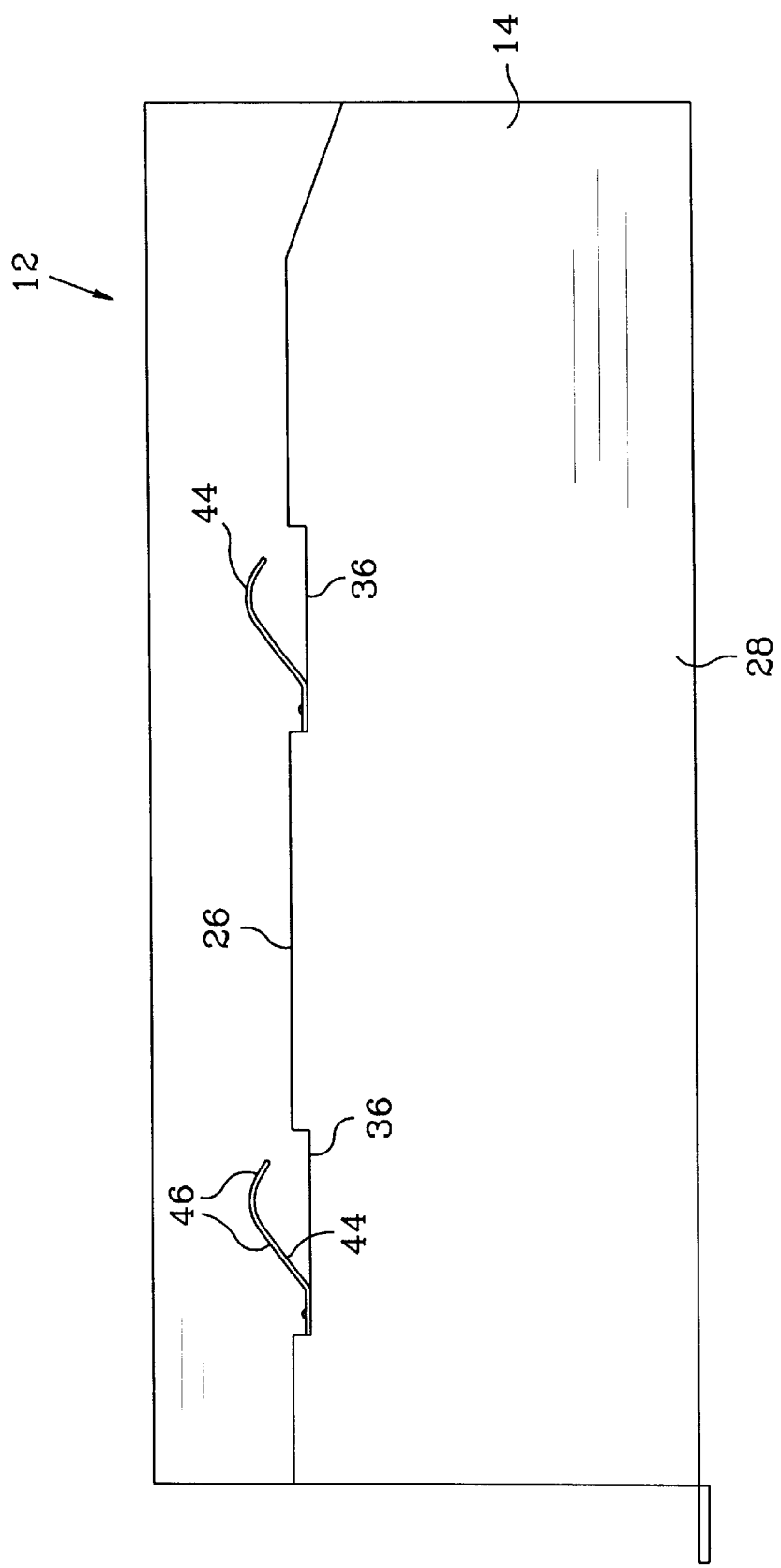
FIG. 6 is a side elevation view of the module and spacer of FIG. 5.
Figure 7:
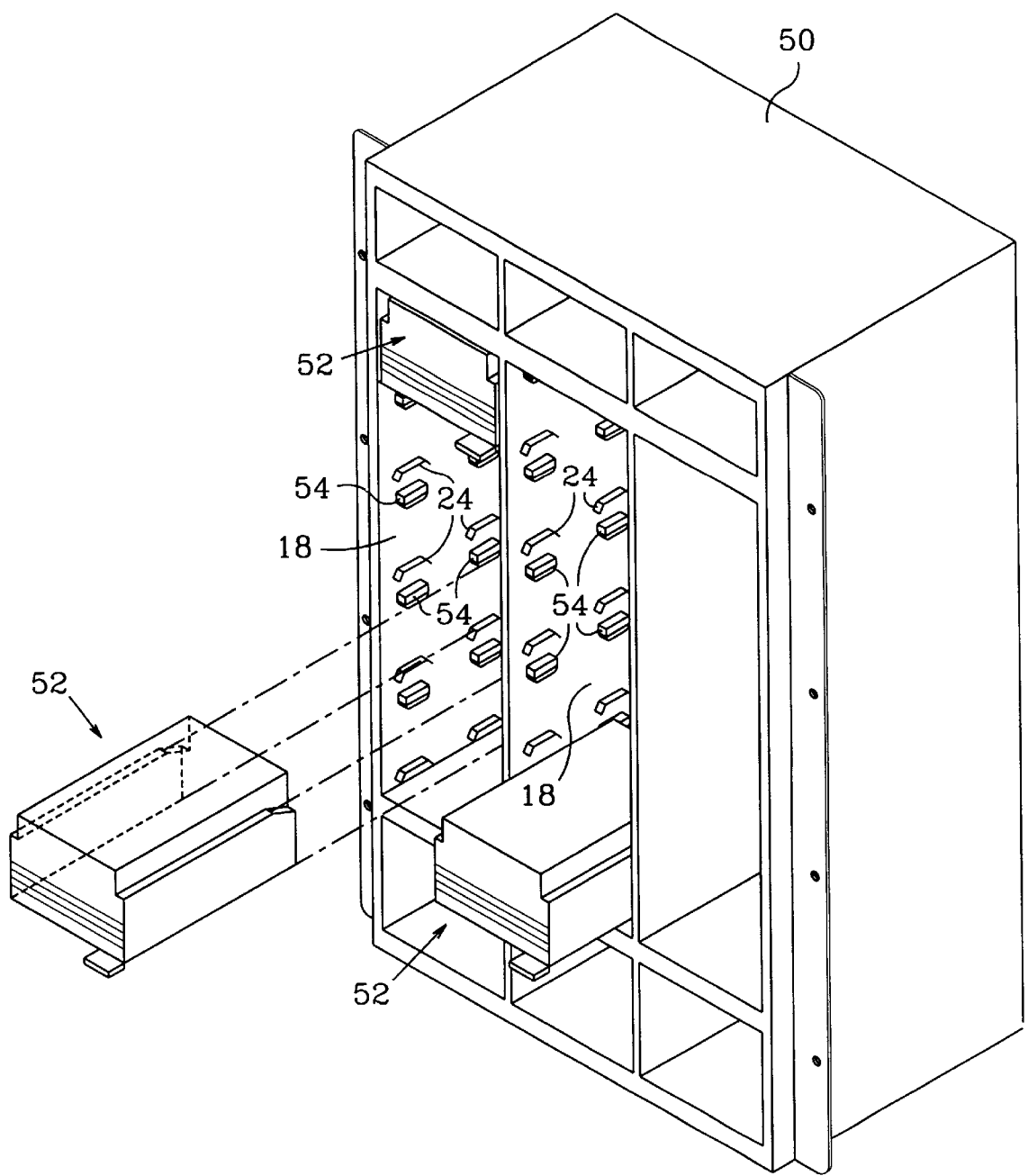
FIG. 7 is an isometric view of an enclosure constructed according to one version of a second embodiment of the invention in which a flexible guide is used to guide modules into the enclosure. The enclosure houses an array of conventional disk drive modules.

In a second version of this embodiment of the invention, illustrated in FIGS. 5 and 6, spacer 30 is a spring 44. Spring 44 is a flat spring secured to module housing 14 in recesses 36. Spring 44 is sized and shaped to extend up a predetermined distance D above surface 38 of ledges 26. To ease installation of modules 12 in enclosure 10, spring 44 should also be shaped to present inclined surfaces 46 to top guides 22 as modules 12 are inserted into and withdrawn from enclosure 10.

A second embodiment of the invention is illustrated in FIGS. 7–10. In the second embodiment, a flexible guide formed on or fastened to the enclosure provides the desired tight but flexible fit between module housing 14 and enclosure 10. In a first version of this embodiment, and referring to FIGS. 7 and 8, enclosure 50 houses an array of conventional storage modules 52. Modules 52 slide into a series of slots 18 constructed along the interior walls 20 of enclosure 50. Slots 18 are defined by a series of flexible top guides 54 and bottom guides 24 formed in or secured to interior walls 20 of enclosure 10.

Figure 8:
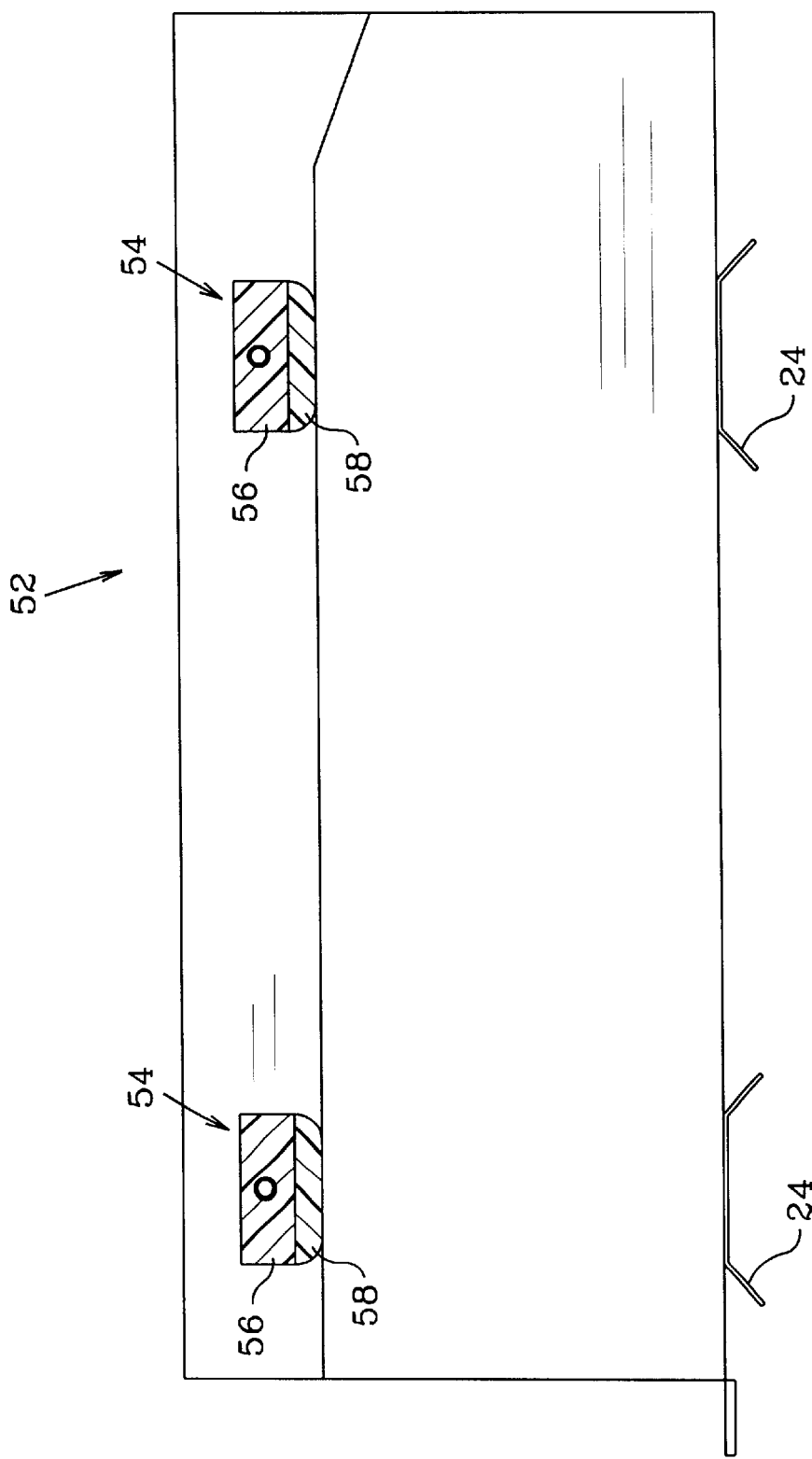
FIG. 8 is a side elevation view of a portion of the enclosure of FIG. 7 showing the rigid and flexible portions of the guide of FIG. 8.

The details of flexible top guides 54 will now be described with reference to the more detailed view of FIG. 8. Referring to FIG. 8, top guides 54 include a flexible top portion 56 and a rigid bottom portion 58. Rigid bottom portion 58 protrudes into the space occupied by module housing 14 to create a slight interference fit between module housing 14 and guides 54 and 24. Top portion 56 is made of an elastomeric or other suitably flexible material. Bottom portion 58 is made of hard plastic or other suitably rigid, preferably smooth material. When a module 12 is inserted into a slot 18 and rigid bottom portion 58 of guide 54 engages ledge 36 on module housing 14, flexible top portion 56 compresses to allow the module to continue to slide into slots 18 while maintaining a tight but flexible fit between module housing 14 and enclosure 10. It may be desirable, as shown in FIG. 8, to round or bevel the front and back faces 60 and 62 of top guide 54 to help module housing 14 slide easily into and out of enclosure 10.

Although it is expected that top and bottom portions 56 and 58 will be glued or bonded together and top guide 54 riveted to walls 20 of enclosure 10, any suitable attachment method or device may be used.

Figure 9:
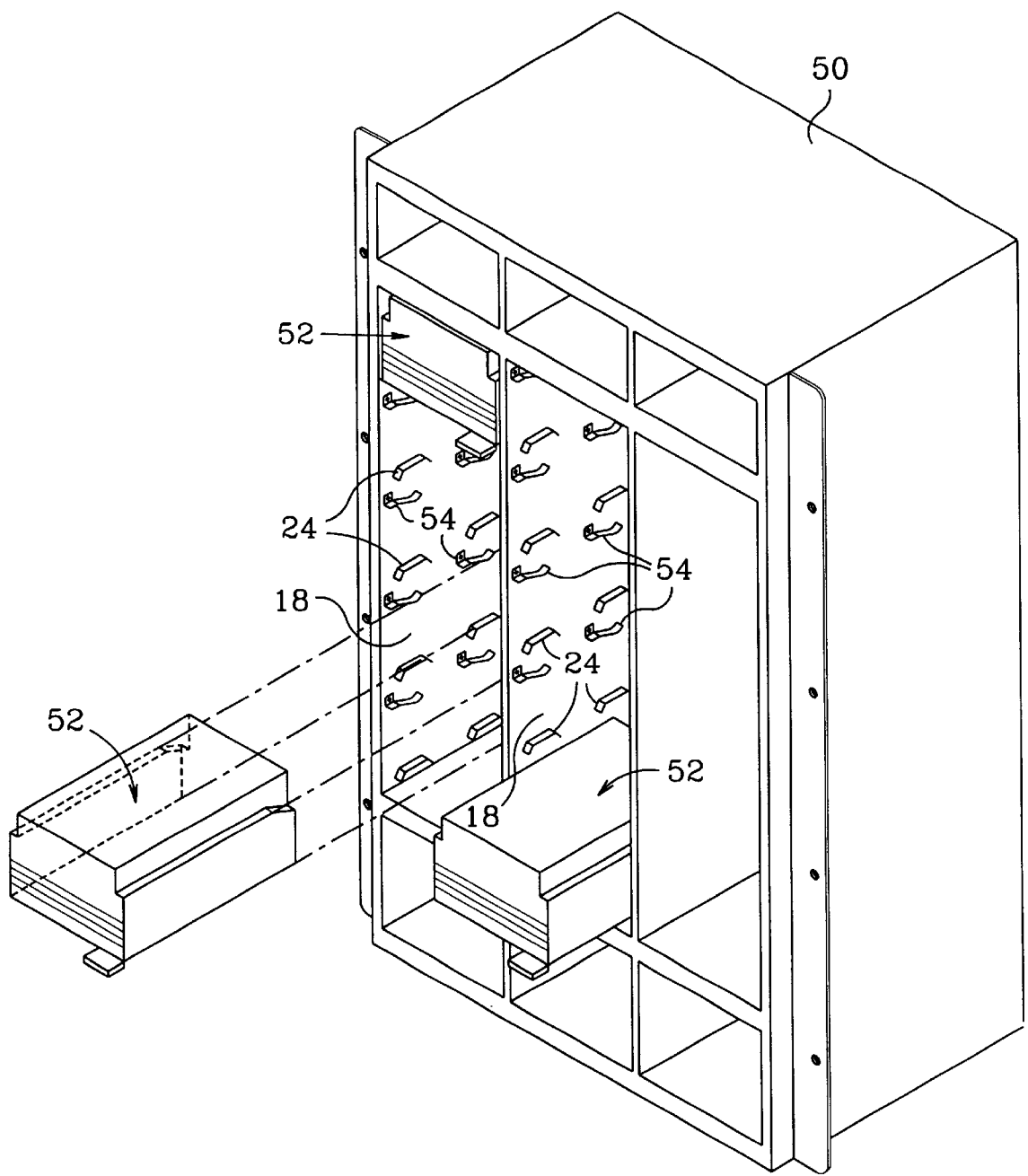
FIG. 9 is an isometric view of an enclosure constructed according to a second version of the second embodiment of the invention in which a flexible guide is used to guide modules into the enclosure. The enclosure houses an array of conventional disk drive modules.
Figure 10:
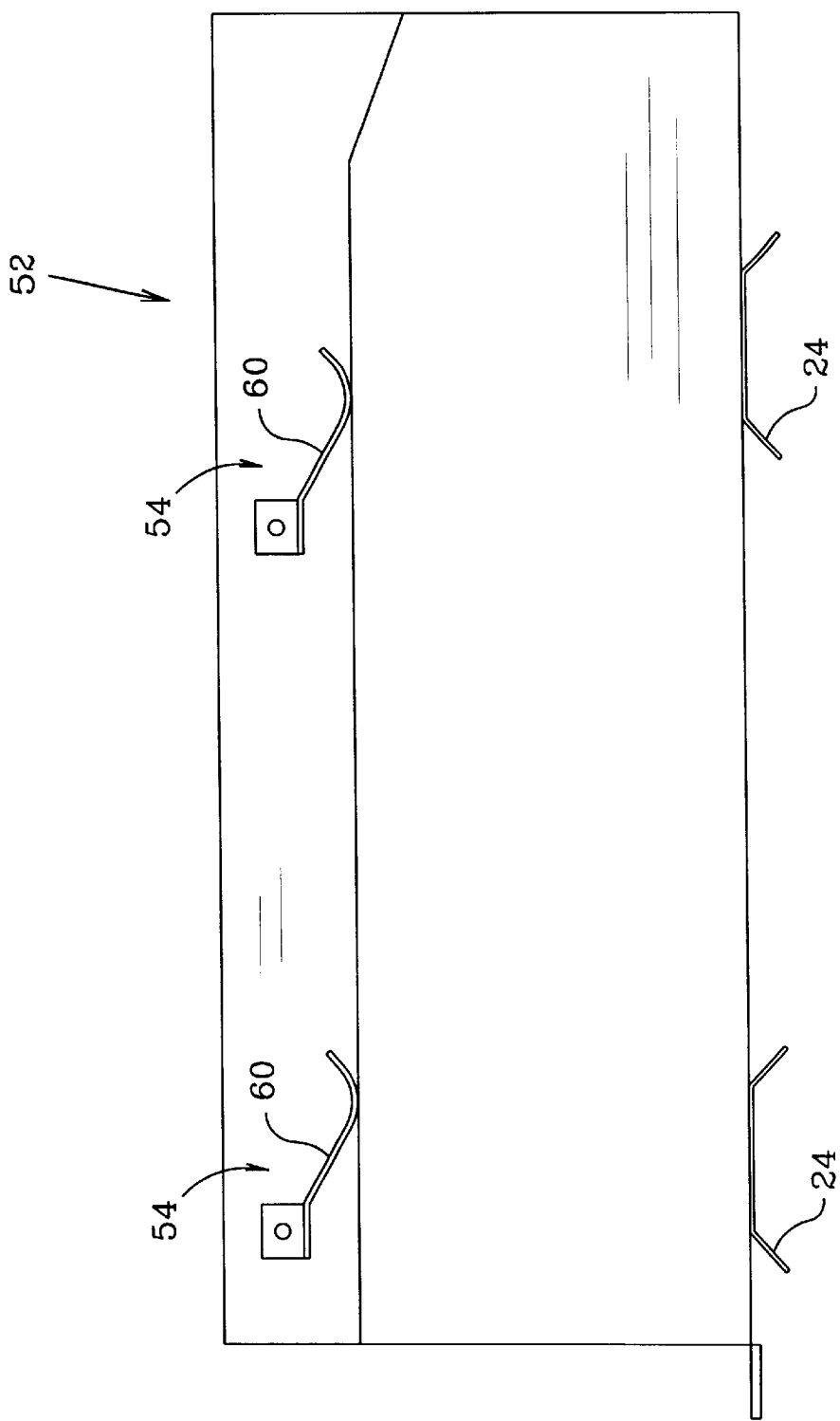
FIG. 10 is a side elevation view of a portion of the enclosure of FIG. 9 showing the second version of the flexible guide of the present invention in which the guide is a spring.

In a second version of this embodiment of the invention, illustrated in FIGS. 9 and 10, flexible top guide 54 is a spring 60. Spring 60 is a flat spring secured to interior walls 20 of enclosure 10. Spring 60 is sized and shaped to protrude into the space occupied by module housing 14 to create a slight interference fit between module housing 14 and guides 54 and 24. To ease installation of modules 12 in enclosure 10, spring 60 should also be shaped to present inclined surfaces 42 to module housing 14 as modules 12 are inserted into and withdrawn from enclosure 10.

Although the invention has been shown and described with reference to the foregoing exemplary embodiments, alternative embodiments may be made. For example, flexible spacers 30 could be located on bottom edge 28 of module housing 14, or on both ledge 26 and bottom edge 28. Similarly, flexible guides could be used as either the top or bottom guides on enclosure 10, or both. Therefore, it is to be understood that these and other variations of and modifications to the embodiments shown and described may be made without departing from the spirit and scope of the invention as defined in following claims.

What is claimed is:

1. A data storage module, comprising: a housing having bearing surfaces configured to bear against guide surfaces in a module enclosure; a spring protruding from at least one of the bearing surfaces.

2. An enclosure for data storage modules, comprising:
opposing side walls and an open end; and
a plurality of slots along each sidewall, the slots configured to receive data storage modules through the open end of the enclosure, each slot defined by one or more pairs of first guides and opposing second guides protruding from each sidewall to bear on the storage modules, the first and second guides spaced apart a distance slightly less than a thickness of the storage modules, and one of the first or second guides in each pair comprising a flexible member.

3. The enclosure according to claim 2, wherein the flexible member comprises an elastomeric member.

4. The data storage module according to claim 2, wherein the flexible member comprises a spring.

5. The data storage module according to claim 2, further comprising a plurality of data storage modules slidably disposed in the slots.

6. An enclosure assembly of data storage modules, comprising:

an enclosure having opposing sidewalls, an open end, and a plurality of slots along each sidewall, the slots configured to receive data storage modules through the open end of the enclosure, each slot defined by one or more pairs of first guides and opposing second guides spaced apart from one another and protruding from each sidewall to bear on the storage modules; and a plurality of storage modules slidably disposed within the slots of the enclosure, each storage module comprising a housing and a data storage device in the housing, each housing having first and second bearing surfaces that bear against the first and second guides of the enclosure, the first and second bearing surfaces spaced apart a distance nominally equal to the distance between the first and second guides, and each housing having at least one flexible spacer protruding from at least one of the first or second bearing surfaces.

7. The assembly according to claim 6, wherein the flexible spacer comprises an elastomeric member.

8. The assembly according to claim 6, wherein the flexible spacer comprises a spring.

* * * * *